April 22, 1924.
D. A. REGAN
PET COCK OPENER
Filed Feb. 13, 1923
1,491,629
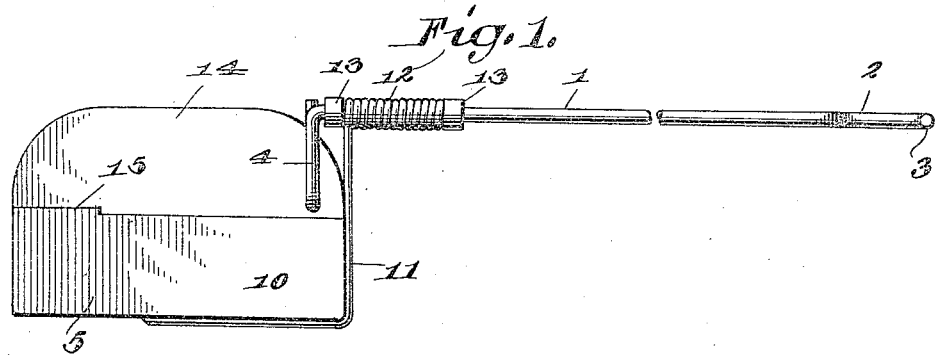
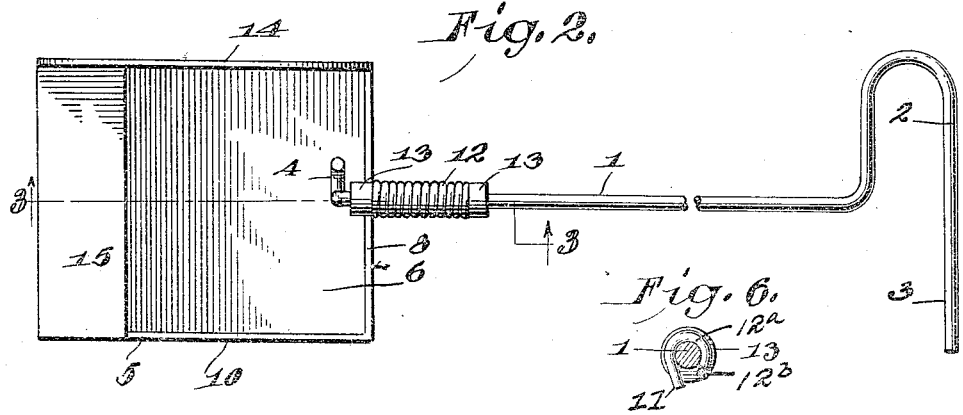
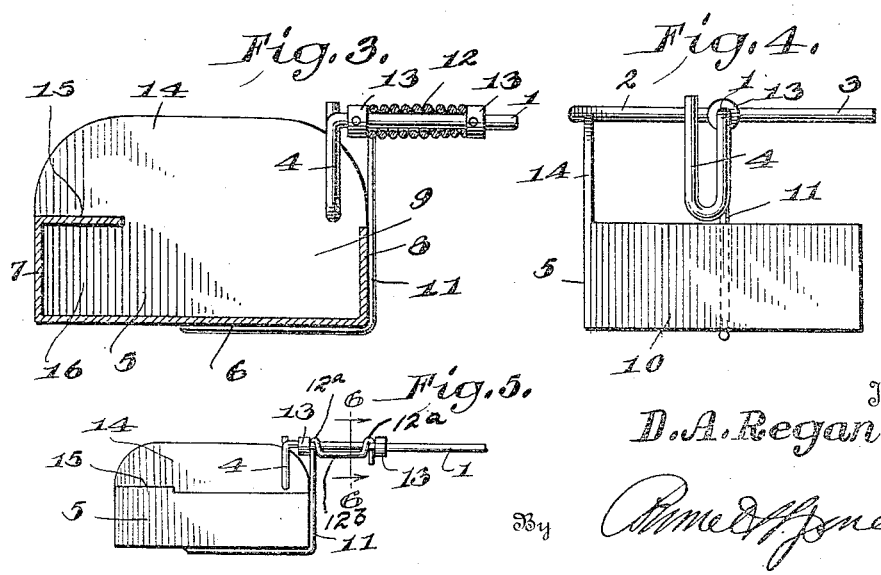
Inventor
D. A. Regan Patented Apr. 22, 1924.

1,491,629

UNITED STATES PATENT OFFICE.

DAVID A. REGAN, OF COLORADO SPRINGS, COLORADO.

PET-COCK OPENER.

Application filed February 13, 1923. Serial No. 618,861.

*To all whom it may concern:*

Be it known that I, DAVID A. REGAN, a citizen of the United States, residing at Colorado Springs, in the county of El Paso and State of Colorado, have invented new and useful Improvements in Pet-Cock Openers, of which the following is a specification.

This invention relates to pet cock openers, designed primarily for opening the pet cock of an automobile, such as a Ford car, in order to enable the operator of the car, or a repair man or garage service attendant, to determine whether or not the oil in the crank case is at the proper level.

One object of the invention is to provide a simple, convenient and inexpensive type of device of this character which will enable the comparatively inaccessible pet cock to be easily reached and the pet cock opened so as to determine by the outflow or lack of outflow of oil therefrom whether or not the oil in the crank case is at the proper working level.

A further object of the invention is to provide a device of this character having a novel form and construction of pet cock actuating key and a novel form and construction of actuating crank handle whereby economy and simplicity of construction is secured.

A still further object of the invention is to provide a device of the character described having a cock actuating rod and a drip pan for catching any oil which may escape from the cock, said pan being pivotally mounted so as to normally maintain a working position and having means for retaining the oil flowing therein, so that any flow of oil from the pet cock onto the floor will be prevented and the device adapted to be hung up on a support without escape of the oil therefrom.

The invention consists of the features of construction, combination and arrangement of parts hereinafter fully described and claimed, reference being had to the accompanying drawing, in which:—

Figure 1 is a view in elevation of a pet cock opener embodying my invention, looking toward one side thereof.

Figure 2 is a top plan view of the same.

Figure 3 is a vertical longitudinal section taken on line 3—3 of Figure 2.

Figure 4 is an end elevation of the device.

Figure 5 is a view similar to Figure 3, showing a modification.

Figure 6 is a cross-section on line 6—6 of Figure 5.

In carrying my invention into practice I provide a pet cock actuating rod 1, of suitable length for the purpose, and bent at its outer or rear end to provide a substantially U-shaped crank handle 2, disposed at right angles to the body of the rod, said crank handle also forming an extension arm 3 providing a means whereby the device may be hung or suspended vertically from a support on a wall or other surface. At its forward end the rod 1 is bent to provide a U-shaped or loop-shaped key or engaging member 4, of suitable type to be longitudinally engaged with and disengaged from the pet cock handle and to turn the handle in one direction or the other for opening or closing the cock when proper reverse rotary motions are imparted to the rod 1 through the medium of its actuating handle 2.

Carried by the forward end of the rod is a drip pan 5, made of sheet metal or other suitable material. This pan may be of suitable form for the purpose, but is shown in the present instance as being of oblong rectangular form and comprising a bottom wall 6, front and rear end walls 7 and 8 and side walls 9 and 10, respectively. Secured to the underside and rear wall 8 of the pan is a bracket member 11, preferably made of wire, one end of which extends a suitable distance above the upper edge of the wall 8 and is formed to provide a cylindrical coil 12. This coil receives the portion of the rod 1 immediately in rear of the key 4, the rod extending through said coil, and the coil therefore forming a support for pivotally mounting the pan upon the rod. This pivotal connection permits the rod to be turned or rotated in either direction independently of the pan 5. Collars 13 are applied upon and fixed to the rod 1 and bear upon the ends of the coil 12 to hold said coil against endwise shifting movement.

The device is designed to be inserted or applied in such manner as to engage the key 4 with the handle of the pet cock, and to dispose the pan 5 immediately below the nozzle of the pet cock, so that by turning the rod 1 in one direction the pet cock will be opened and any oil which may escape therefrom, and which will indicate that the oil in the crank case is at proper level, will be caught in the pan 5. By this means loss of oil will be prevented and the oil kept from dripping out upon the floor, so that the floors of garages and service stations, where this operation is carried out repeatedly, may be kept clean. By turning the rod 1 in the reverse direction the cock may be closed, whereupon the key 4 may be withdrawn endwise from engagement with the cock and the pan 5 may be removed with the rod containing any oil which may have escaped from the cock and was caught therein.

The pan 5 is so weighted as to normally maintain a horizontal position, which position it maintains by gravity through its pivotal connection with the rod 1. In order to prevent possible escape of oil flowing from the cock at the side of the pan adjacent to the crank case, the pan is preferably provided with an upstanding guard or deflector apron 14, which may be integral with and constitute an upward extension from its side wall 9, said apron serving in an obvious manner to prevent the oil from flowing or splashing out at such side. I also provide the front wall 7 with an extension 15 projecting inward a suitable distance in parallel relation to the bottom wall 6, whereby an oil retaining compartment 16 is provided at the forward end of the pan body. This allows any oil which may be caught in the pan to be received and held, while the device is being transported from place to place in a vertical position, and also allows the device to be hung vertically upon a wall or other support without the oil spilling out until such time as the user or attendant may have the opportunity of removing it.

From the foregoing description, taken in connection with the drawing, the construction and mode of use of my improved pet cock actuating device and drip pan will be readily understood, and it will be seen that the invention provides a device of this character which is simple of construction, may be manufactured and sold at a comparatively low cost and which may be readily and conveniently employed for opening and closing the pet cocks of Ford or other cars for the purpose of determining whether or not the oil is at the proper level in the crank case. Also it will be seen that the invention provides a construction of drip pan which will maintain its working position when the pan is in use and catch any oil escaping from the pet cock, preventing it from flowing upon the floor, and which is also adapted to retain the oil and prevent its escape while the device is being transported or hung vertically upon a support. Other conveniences and advantages of the invention will be readily understood without a further and extended description.

In Figures 5 and 6 I have shown a modification in the means for pivotally mounting the pan 5 upon the rod 1 wherein the free end of the wire 11 is bent to form hooked portions 12$^a$ united by a connecting arm 12$^b$ and forming a clasp to engage rod 1. The contracted portions of the hooks of this clasp are adapted to move apart under pressure to allow the rod 1 to pass into the eye portions of the hook and then contract by the spring action or resiliency of the wire to retain the clasp in engagement with the rod, whereby the pan is pivotally and detachably mounted on the rod. This construction adapts the improved pan to be mounted on rods already in use so that the pans may be sold separately from the rods and readily and conveniently applied for use upon a rod.

Having thus fully described my invention, I claim:—

1. A pet cock opener comprising a rod having a pet cock handle engaging key, a drip pan, and a hanger secured to the pan and formed with a coiled sleeve pivotally engaging said rod.

2. A pet cock opener comprising an actuating rod having a cock actuating member, and a drip pan pivotally mounted upon the rod and provided with an oil receiving chamber, an apron at one side extending above the level of the top of said chamber, and a compartment at its forward end partially formed by said chamber.

3. A drip pan for attachment to a pet cock test rod comprising a pan body provided with an oil receiving chamber, a compartment at one end of said chamber, and an apron at one side of the chamber and extending above the level of the top thereof, and means for pivotally mounting the pan on the rod.

In testimony whereof I affix my signature.

DAVID A. REGAN.